US007986129B2

(12) United States Patent
McBee

(10) Patent No.: US 7,986,129 B2
(45) Date of Patent: Jul. 26, 2011

(54) METHOD AND SYSTEM FOR FLOAT CHARGING A BATTERY

(75) Inventor: Bruce W. McBee, Brookfield, WI (US)

(73) Assignee: Cooper Technologies Company, Houston, TX (US)

( * ) Notice: Subject to any disclaimer, the term of this patent is extended or adjusted under 35 U.S.C. 154(b) by 864 days.

(21) Appl. No.: 12/006,306

(22) Filed: Jan. 2, 2008

(65) Prior Publication Data

US 2009/0167238 A1 Jul. 2, 2009

(51) Int. Cl.
*H01M 10/44* (2006.01)
(52) U.S. Cl. ...................................... 320/128
(58) Field of Classification Search .............. 320/107, 320/128, 130, 131, 132, 134, 135, 136, 150, 320/160, 162
See application file for complete search history.

(56) References Cited

U.S. PATENT DOCUMENTS

| 2,715,710 | A * | 8/1955 | Godshalk et al. ............ 320/126 |
| 5,708,348 | A | 1/1998 | Frey et al. |
| 6,184,650 | B1 * | 2/2001 | Gelbman ................... 320/100 |
| 6,252,373 | B1 * | 6/2001 | Stefansson et al. .......... 320/106 |
| 2002/0050805 | A1 * | 5/2002 | Petrovic ..................... 320/130 |
| 2005/0225299 | A1 * | 10/2005 | Petrovic ..................... 320/141 |
| 2005/0249899 | A1 | 11/2005 | Bonutti |
| 2006/0238166 | A1 | 10/2006 | Wanibuchi |
| 2007/0085693 | A1 | 4/2007 | Feight |

OTHER PUBLICATIONS

Written Opinion and International Search Report issued Feb. 24, 2009 for corresponding PCT application PCT/US2008/088098 (8 sheets).

* cited by examiner

*Primary Examiner* — Edward Tso
(74) *Attorney, Agent, or Firm* — King & Spalding LLP

(57) ABSTRACT

Float charging a battery comprises charging a battery to a reference voltage that is less than a maximum voltage of the battery. A power source provides power to a charging circuit. The circuit supplies a reference voltage. An operational amplifier float charges the battery to the reference voltage. A comparator determines whether the battery's voltage exceeds the reference voltage. Another comparator determines whether current through the battery exceeds a reference current. A thermistor determines whether the battery's temperature exceeds a safe range. A microprocessor monitors the inputs from the comparators and the thermistor and outputs of the circuit. If the comparators or the thermistor reports a safety fault to the microprocessor, the microprocessor shuts down the charging current to the battery. If an output circuit draws too much current from the battery, the microprocessor can disconnect the battery from the output circuit.

25 Claims, 4 Drawing Sheets

METHOD AND SYSTEM FOR FLOAT CHARGING A BATTERY

RELATED APPLICATIONS

This application is related to U.S. patent application Ser. No. 11/982,587, entitled "Faulted Circuit Indicator Apparatus with Transmission Line State Display and Method of Use Thereof," filed on Nov. 2, 2007; and U.S. patent application Ser. No. 11/982,588, entitled "Communicating Faulted Circuit Indicator Apparatus and Method of Use Thereof," filed on Nov. 2, 2007. The complete disclosure of each of the above-identified related applications is hereby fully incorporated herein by reference.

TECHNICAL FIELD

The present invention relates to a battery power supply and more particularly to a circuit for recharging a battery used to power remote sensors, such as faulted circuit indicators.

BACKGROUND

Faulted circuit indicators (FCIs) are well known in the field of electric power distribution systems. Generally, FCIs are electrically connected to transmission lines in a power distribution system at various locations throughout the system, often in close proximity to system loads. When a fault occurs in a transmission line, FCIs between the power source and the fault will detect that a fault has occurred. Typically, FCIs that have detected a fault then display an indication that the fault has been detected. An FCI also can include a conventional transmitter for communicating faults to another location. A technician can then identify a fault by locating the transmission line between an FCI that indicates it has detected a fault and an FCI that does not indicate a fault.

FCIs and other types of sensors may be deployed widely to monitor systems in remote locations and in harsh environmental conditions. The difficulty of powering remote sensors, such as FCIs, has long been a problem limiting the sensors' lifespan and usefulness. Generating adequate power to a remote sensor requires the use of large primary batteries, which is cost prohibitive. As a result of a lack of sufficient power to remote sensors, the sensors must power down for periods of time to conserve energy, which results in a lack of communication from the sensors during down time.

Lithium primary cells, which are not rechargeable, provide one option as a power source for remote sensors. However, most transmitters for remote sensors require instantaneous power in amounts too large for lithium primary cells to provide. Additionally, non-rechargeable batteries require routine replacement at relatively short intervals.

Remote sensors could harvest power from other sources, such as solar, inductive, biological, or mechanical means. However, the inconsistent nature of these sources requires a system to capture the energy and store it for later use. Additionally, conventional sensors cannot withstand the harsh environments—−45 to +85 degrees Celsius—in which remote sensors usually are deployed can pose nearly insurmountable challenges, especially in the small packages required by modern electronics. Obtaining a life expectancy of more than two to three years for conventional sensors is unlikely in the absence of burdensome extra circuitry and devices that cool or heat the sensor to keep the charge receptor at or close to room temperature.

Several conventional devices have been developed to try to address the deficiencies associated with conventional sensors and their power sources. However, all such conventional devices have shortcomings. The various faults of these devices result in remote sensors that are expensive, short lived, or both. For example, a conventional solution is to use devices such as supercapacitors to power a remote sensor. However, supercapacitors work well only in applications that operate in environments close to 25 degrees Celsius. Thus, supercapacitors fail to provide the necessary functionality in the extreme environments of remote sensing applications.

In addition, lithium polymer and lithium ion cells have been identified as options. However, charging these cells can be difficult because of the environmental constraints of remote sensing. Conventionally, such cells are charged to their maximum allowable voltage, which yields the maximum capacity. Storing lithium cells when charged to maximum capacity will severely limit the cells' life expectancy. Fully charging a rechargeable lithium cell greatly degrades the cell, causing premature failure and reducing shelf life to less than three to four years. Additionally, developing circuitry to monitor and charge these systems at the available low power inputs can be prohibitive.

As discussed previously, lithium cells ordinarily are charged to the maximum allowable voltage. By charging to the maximum voltage, users of laptop computers, for example, can extend the maximum period of continuous use. However, this method of charging results in successive periods of charging to the maximum voltage capacity followed by periods of partially discharging the lithium cell. Such patterns of use severely degrade the life of a battery. Accordingly, traditional methods of charging lithium cells cannot provide the consistency and longevity required in remote sensing applications.

Accordingly, a need exists in the art for a power source for remote sensors that addresses the deficiencies of conventional sensors and associated power sources. For example, a need exists in the art for extended battery life in remote sensing operations. A further need exists for a circuit for float charging a battery to a predetermined voltage that will extend the life of the battery. A need also exists for float charging a battery as a way to provide sufficient and consistent power to remote sensors and to prevent down time resulting in loss of communication.

SUMMARY

The proposed solution is to float charge a rechargeable battery at its optimum storage voltage. The present invention involves using a limited current to charge a battery to a specified target voltage below the battery's maximum allowable voltage. This float charging method increases a shelf life and longevity of the battery.

In one aspect, a power source provides power to a charging circuit. The circuit supplies a reference voltage. An operational amplifier float charges a battery to the reference voltage. A resistor limits the maximum charging current to the battery, and a diode prevents reverse current that would discharge the battery. The circuit performs several safety checks. A comparator determines whether the battery's voltage exceeds the reference voltage. Similarly, another comparator determines whether current through the battery exceeds a reference current. Also, a thermistor determines whether the battery's temperature exceeds a safe range. A microprocessor monitors the inputs from the comparators and the thermistor and outputs of the circuit. If the comparators or the thermistor reports a safety fault to the microprocessor, the microprocessor can operate a switch off to shut down the charging current to the battery. If an output circuit draws too much current from the battery, the microprocessor also can operate a second switch to disconnect the battery from the output circuit.

In an alternative aspect, a linear regulator float charges the battery to the reference voltage. In addition to the safety features listed above, the microprocessor can directly shut off the linear regulator to prevent overcharging or other dangerous conditions. When operating with high voltages, the charging circuit can accommodate multiple capacitors for filtering purposes.

Additional aspects, features, and advantages of the invention will become apparent to those having ordinary skill in the art upon consideration of the following detailed description of illustrated embodiments exemplifying the best mode of carrying out the invention as presently perceived.

DETAILED DESCRIPTION

It is not an accepted practice in the art to float charge lithium cell batteries. In fact, manufacturers of lithium cells generally recommend charging the cells to the maximum allowable voltage to extend a potential period of continuous use. However, by charging to the maximum allowable voltage a user will drastically reduce the life expectancy of a lithium cell. Thus, the manufacturers' recommendations foreclose the use of lithium cells in remote sensing applications.

According to the present invention, a user can lengthen the life of a lithium cell considerably by float charging the cell to a specified target voltage below the maximum capacity voltage. "Float charging" means charging a battery at the same rate it is discharging. The float charging circuit charges the battery essentially at the same rate the battery discharges to an output circuit or dissipates during inactive periods, thus maintaining the battery's voltage at the specified target voltage. This method of charging can increase the life of the battery to a decade or more, making the lithium cell suitable for remote sensing applications. Additionally, this method of float charging demonstrates inherent safety qualities by reducing the risk of overheating or explosion of the lithium cell associated with overcharging. The present invention can accommodate additional safety features as well, including over-voltage, over-current, and temperature protection.

Figure 1:
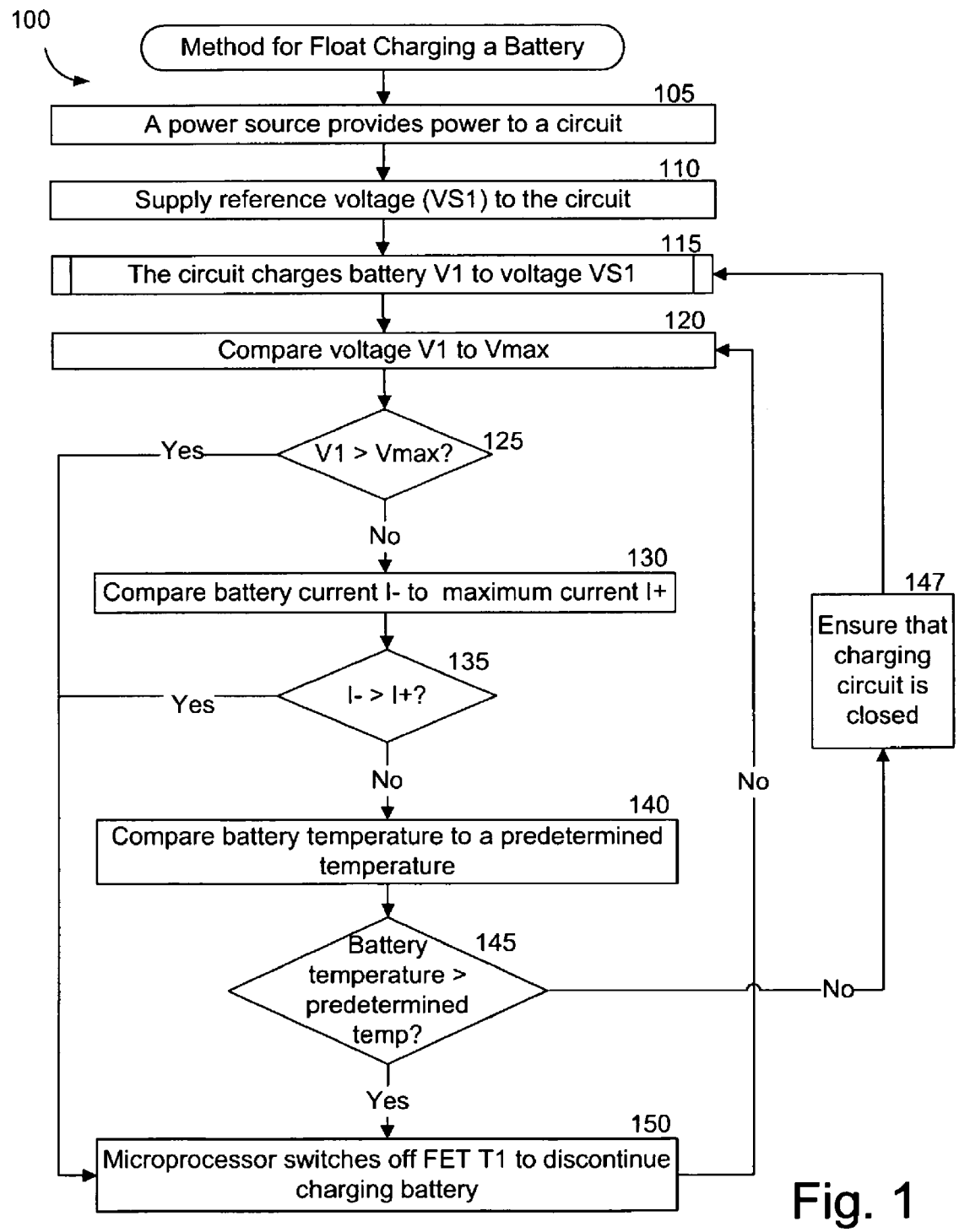
FIG. 1 is a functional block diagram illustration of a method for float charging a battery according to an exemplary embodiment of the invention.

FIG. 1 illustrates a method 100 for float charging a battery according to an exemplary embodiment of the invention. FIG. 1 will be described with reference to FIG. 3, which illustrates a circuit 300 for float charging a battery V1 using an operational amplifier OP1 according to an exemplary embodiment of the invention. In step 105, a power source 302 provides power to the circuit 300. The circuit may use any suitable power source, including a solar cell, a fuel cell, a battery, a current transformer, or another suitable source. In one exemplary embodiment, the float charging circuit 300 can draw power from the current transformer (not shown) of a faulted circuit indicator (not shown).

In step 110, a reference voltage VS1 is supplied to the circuit 300. The reference voltage VS1 provides a target float charge voltage for the battery V1. The reference voltage can be calibrated according to the float charge voltage that will maximize the life of the battery V1. The appropriate float charge voltage can generally be determined from a manufacturer's recommended voltage for storage of the battery V1. In an exemplary embodiment, the battery V1 can be any rechargeable lithium-ion cell, lithium phosphate cell, or lithium polymer cell, or any other suitable type of battery. In an exemplary embodiment, the float charging circuit 300 will charge the battery V1 to between forty percent and seventy percent of the battery V1's maximum capacity. In another exemplary embodiment, the float charging circuit 300 will charge the battery V1 to between fifty percent and fifty-five percent of the battery V1's maximum capacity. For example, float charge for a lithium ion or lithium polymer cell can be between 3.6 and 3.7 volts for a battery having a maximum voltage of 4.2 volts, and float charge for a lithium phosphate cell can be 3.4 volts for a battery having a maximum voltage of 4.2 volts. In one exemplary embodiment, maximum capacity can be measured in ampere hours.

Figure 2:
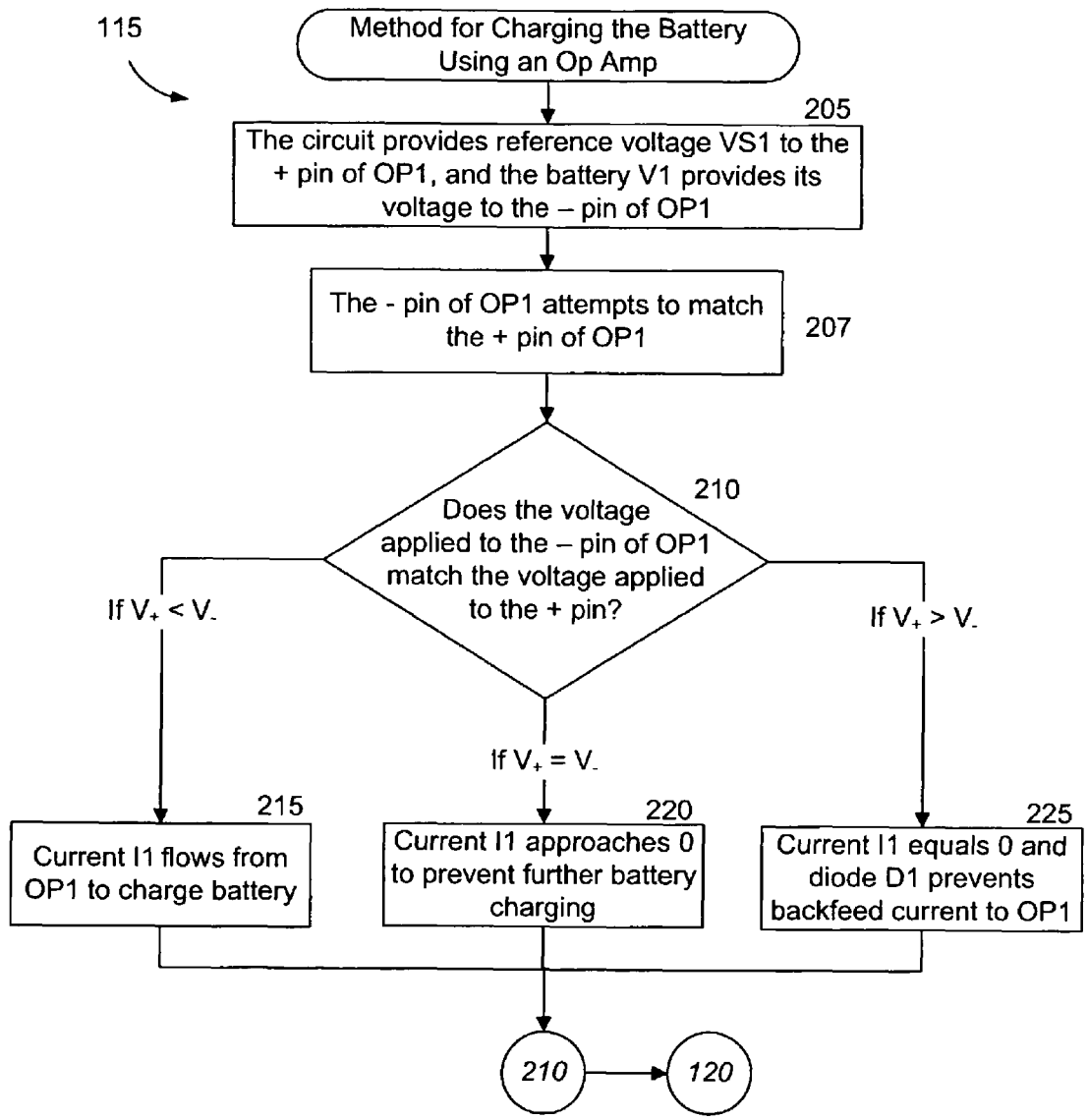
FIG. 2 is a functional block diagram illustration of a method for charging a battery using an operational amplifier according to an exemplary embodiment of the invention.

In step 115, through the use of operational amplifier OP1, the circuit 300 charges the battery V1 to the desired float charge voltage. Step 115 will be described in further detail hereinafter with reference to FIG. 2. FIG. 2 illustrates a method 115 describing the function of operational amplifier OP1 as a charging mechanism according to an exemplary embodiment of the invention. Alternative embodiments may use a linear regulator or other suitable device to charge the battery to the desired float charge voltage.

While the circuit 300 charges the battery, it also conducts several safety checks, as illustrated in steps 120-145 of FIG. 1. As shown in FIG. 1, the circuit 300 performs the safety checks sequentially. In alternative embodiments, the safety checks may be performed simultaneously.

In step 120, a comparator CP1 compares the battery V1 voltage to a maximum voltage (Vmax) for the battery V1. Resistors R5 and R6 function to set the appropriate maximum voltage for the over-voltage function of comparator CP1. A person having ordinary skill in the art will be able to choose the resistance levels of resistors R5 and R6 appropriately to set the desired trip point for over-voltage protection. In an exemplary embodiment, the maximum voltage can be calibrated to a manufacturer's maximum suggested voltage for the battery V1.

Then, in step 125, the comparator CP1 determines whether the battery V1 voltage is greater or less than the maximum voltage. If the battery V1 voltage is greater than the maximum voltage, the comparator CP1 outputs the information to a microprocessor 306 and the method 100 branches to step 150. In step 150, the microprocessor 306 switches off Field Effect Transistor (FET) T1. When switched off, FET T1 prevents the circuit from charging the battery V1.

Referring back to step 125, if comparator CP1 determines that battery V1 voltage is less than or equal to the maximum voltage, the circuit 300 continues to charge the battery V1 to the desired float charge voltage as determined by the reference voltage VS1.

As a second safety check, a comparator CP2 compares a current I− across the battery V1 to a maximum current I+ in step 130. Resistors R9 and R10 function to set the appropriate reference current I+ for the over-current function of comparator CP2. A person having ordinary skill in the art will be able to choose the resistance levels of resistors R9 and R10 appropriately to set the desired trip point for over-current protection. In an exemplary embodiment, the maximum current I+ can be calibrated to a manufacturer's maximum suggested current for the battery V1.

Then, in step 135, the comparator CP2 determines whether the current I− across the battery V1 exceeds the maximum current I+. If the battery V1 current I− exceeds maximum current I+, comparator CP2 outputs the information to the microprocessor 306 and the method 100 branches to step 150. In step 150, the microprocessor 306 switches off FET T1, as discussed previously.

Referring back to step 150, if the battery V1 current I− is less than or equal to the maximum current I+, the circuit 300 continues to charge the battery V1 to the desired float charge voltage as determined by the reference voltage V1.

As a third safety check, the microprocessor 306 compares in step 140 a temperature of the battery V1, as measured by a temperature sensor NTC, to a predetermined temperature, which can comprise a specified temperature or a temperature range. In one exemplary embodiment, the temperature sensor NTC comprises a thermistor. In alternative embodiments, the microprocessor 306 can directly gauge the battery V1's temperature via its own temperature gauge or another suitable device may be used. In an exemplary embodiment, the predetermined temperature can be calibrated to a manufacturer's suggested safe temperature for the battery V1.

Then, in step 145, the microprocessor 306 determines whether the battery V1 temperature is greater or less than the predetermined temperature. If the battery V1's temperature exceeds the predetermined temperature, the method 100 branches to step 150, in which the microprocessor 306 switches off FET T1, as discussed previously.

Referring back to step 145, if the battery V1 temperature is less than or equal to the predetermined temperature, then the method 100 branches back to step 147 in which the microprocessor ensures that the switch FET T1 is closed. The method 100 then returns to step 115 to continue charging the battery V1 to the desired float charge voltage. Thus, if all three safety checks (steps 125, 135, and 145) are passed, then the circuit 300 will continue to charge the battery V1. If the microprocessor previously opened the switch FET T1 due to a failure of a safety check, the switch FET T1 will be closed in step 147 after all three safety checks are passed.

Referring back to step 150, the method 100 returns from step 150 to step 120 to continue performing the safety checks. Thus, if a previous condition that triggered discontinuing charging the battery V1 returns to a normal state, then the method 100 can continue to monitor the safety checks until all safety checks are passed. At that point, the method 100 branches to step 147 as discussed earlier to continue charging the battery V1.

Because the circuit 300 float charges the battery V1, charging will be performed continuously in the absence of a safety shut down. The method 100 of float charging exhibits inherent safety features. By float charging the battery V1 to a predetermined float charge voltage below the maximum voltage of the battery V1, the method 100 reduces the risk of overheating or explosion associated with batteries, and lithium cells in particular. In addition, the exemplary embodiment of FIG. 3 includes at least one further safety feature not illustrated in FIG. 1. The microprocessor 306 can determine if a load is drawing too much current from an output 308 of the battery V1. If the output 308 draws too much current, microprocessor 308 will switch off FET T2, allowing the float charging circuit to continue float charging without outputting current to the load.

FIG. 2 illustrates a float charging mechanism using an operational amplifier according to an exemplary embodiment of the invention. FIG. 2 will be described with reference to FIG. 3.

In step 205, the float charging circuit 300 supplies the reference voltage VS1 to the + pin of the operational amplifier OP1 (hereinafter V+) and the battery V1 provides its voltage to the − pin of the operational amplifier OP1 (hereinafter V−). In step 207, the operational amplifier OP1 attempts to match the voltage V− to the voltage V+ and charges the battery V1 appropriately as described in steps 210-225.

In step 210, the operational amplifier OP1 determines whether the voltage applied to the − pin (V−) matches the voltage applied to the + pin (V+). If the voltage at the + pin exceeds the voltage at the − pin, the method 115 branches to step 215 in which a current I1 flows from the operational amplifier OP1 to the battery V1, thus charging the battery V1. Resistor R1 functions to limit the amount of current I1 flowing from the operational amplifier OP1. A person having ordinary skill in the art will understand how to choose the appropriate resistance level of R1 to limit current I1 to the desired level.

Referring back to step 210, as the voltages at the + and − pins of operational amplifier OP1 approach equivalent, the method 115 branches to step 220 in which the operational amplifier OP1 controls the current I1 such that current I1 approaches zero to prevent charging the battery V1 beyond the reference voltage VS1. When the voltage at the + pin equals the voltage at the − pin, the current I1 equals zero, and the charging of the battery V1 ceases.

Referring back to step 210, if the voltage at the − pin exceeds the voltage at the + pin, diode D1 prevents backfeed current from the battery V1, I1 equals zero, and charging of the battery V1 ceases.

The method 115 is performed continuously. Thus, from each of steps 215, 220, and 225, the method 115 returns to step 210 to provide the proper current I1 for charging the battery V1. As shown in FIG. 2, the method 115 also proceeds to step 120 (FIG. 1) to allow performance of the safety checks described previously.

Figure 4:
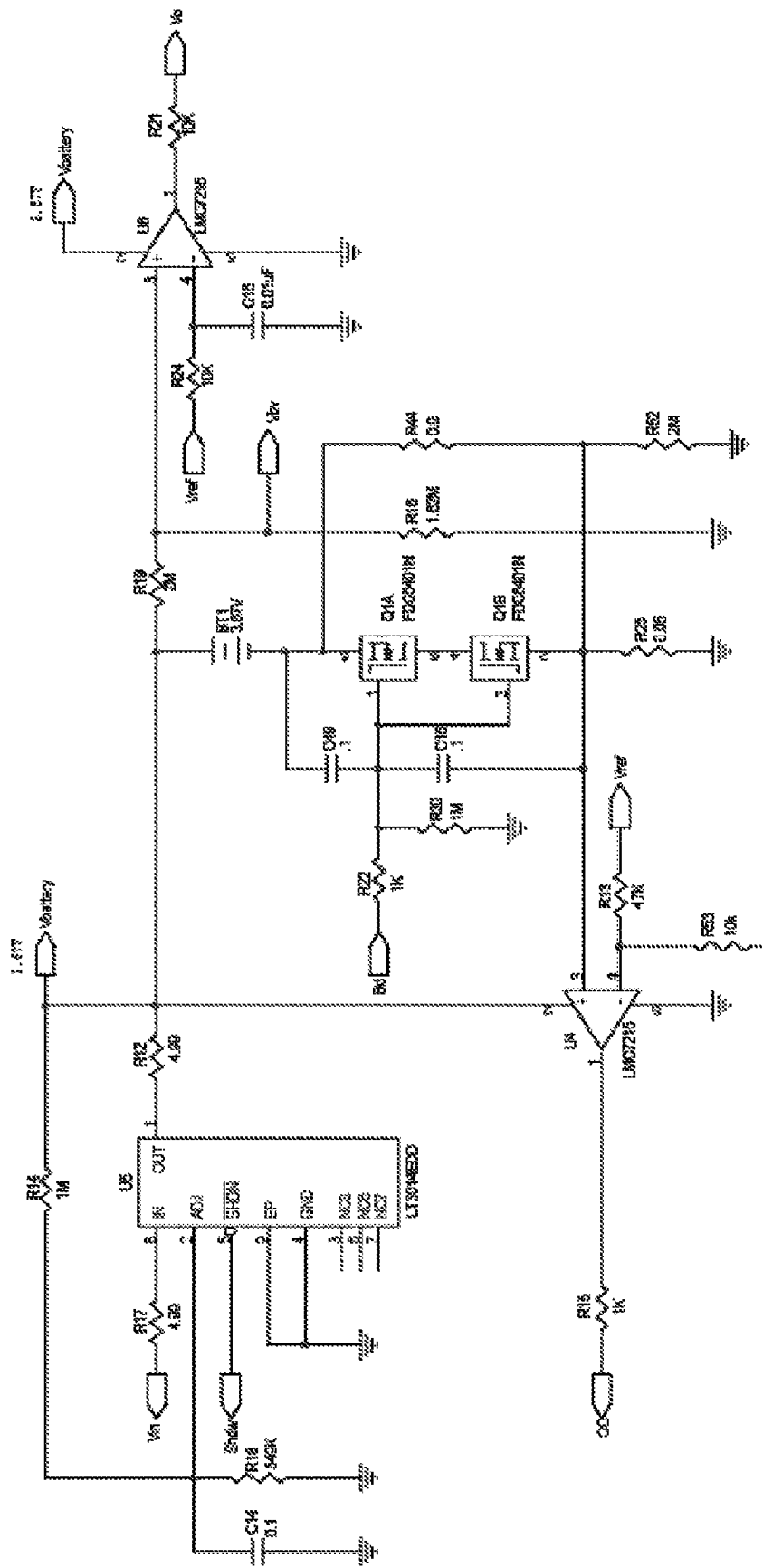
FIG. 4 is a schematic illustration of a circuit for float charging a battery using a linear regulator according to an exemplary embodiment of the invention.

FIG. 4 illustrates a circuit 400 for float charging a battery BT1 using a linear regulator U5 according to an exemplary embodiment of the invention. The circuit 400 can be used as the circuit that charges the battery as referenced in step 115 of FIG. 1, in which case the battery BT1 is the battery V1.

Figure 3:
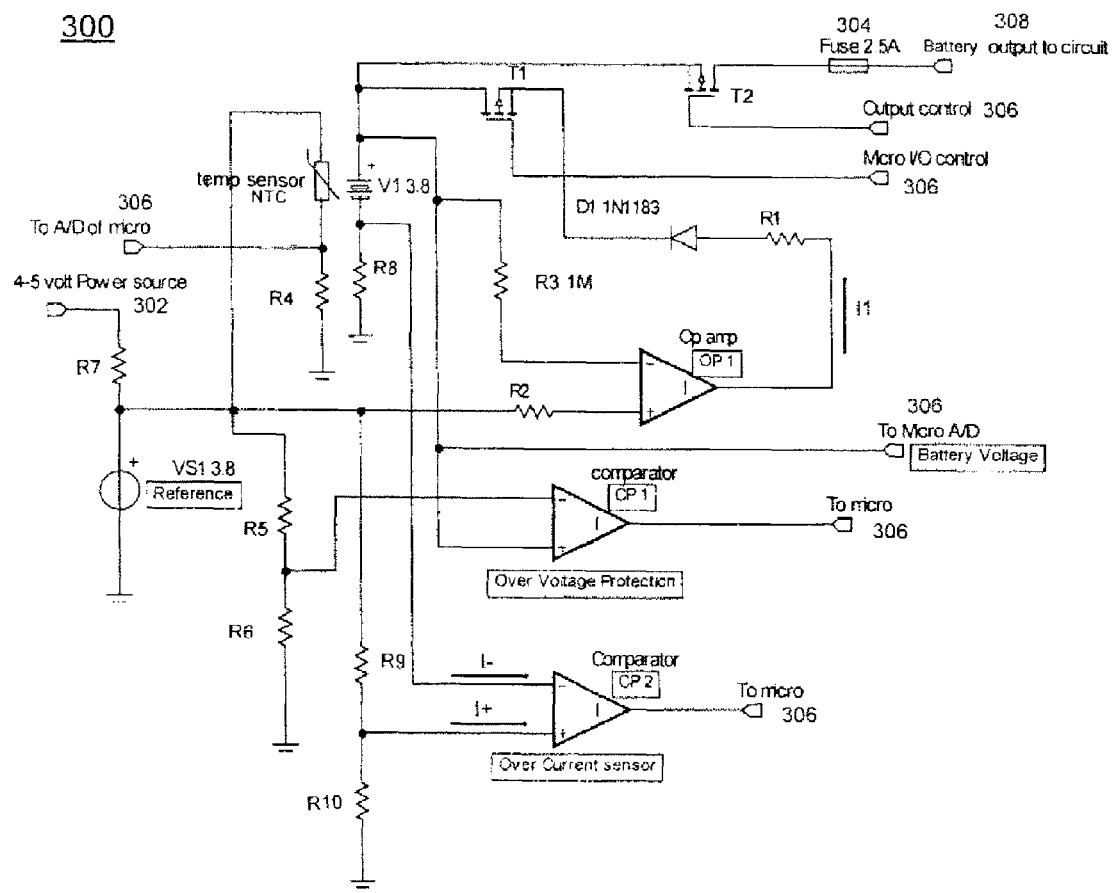
FIG. 3 is a schematic illustration of circuit for float charging a battery using an operational amplifier according to an exemplary embodiment of the invention.

The circuit 400 of FIG. 4 operates in much the same way as the circuit 300 of FIG. 3 to float charge a battery BT1 or V1, respectively. According to the embodiment of FIG. 4, a linear regulator U5 provides a constant voltage to battery BT1. A power source (not shown) provides a voltage Vin to the #8 pin of the linear regulator U5 through a resistor R17 that limits the charge current. The linear regulator U5 provides the constant voltage to the battery BT1 via resistor R12 from the linear regulator U5's #1 pin. The battery V1 voltage is provided to the linear regulator's #2 pin, and the linear regulator U5 controls the voltage to the battery V1 in response.

The circuit 400 also includes safety features. Comparator U6 functions as over-voltage protection and outputs Vo to a microprocessor (not shown). Comparator U4 functions as over-current protection and outputs OC to the microprocessor. If either comparator U6 or U4 indicates a fault, the microprocessor can directly shut off linear regulator U5 and prevent charging of battery BT1. The circuit 400 includes capacitors C14, C49, C15, and C16 for noise filtering purposes.

The circuit 400 was tested to determine whether the charge algorithm operated to float charge the battery BT1. The test supplied a discharged lithium cell battery to the charging circuit, which immediately began float charging at 45 mA of current to the lithium cell. As the lithium cell's voltage increased, the charging current decreased. The test took approximately 30 hours to charge the battery fully. The circuit was also subjected to power surges and transients according to IEC 61000-45. During the test, the circuit's over-current, over-voltage, and overall functionality remained as expected. In a test designed for an external short circuit, the circuit disconnected the battery (through operation of R25 as a fuse), thereby preventing an explosion or an otherwise dangerous increase in temperature. In other safety tests, a thermistor appropriately tracked the temperature of the battery. The over-current protection and over-voltage protection also were tested, both of which operated appropriately to open the float charging circuit as a safety measure.

Different types of batteries, such as lithium cells, have different optimum float charge voltages, which can be based on manufacturer's recommendations for the batteries' storage voltage. The exemplary embodiments illustrated in FIGS. 1-4 can accommodate multiple types of batteries. In particular, the reference voltage VS1 and certain current-limiting resistors can be adjusted to any level appropriate for the target voltage designed to maximize the life of a particular battery. A person having ordinary skill in the art will understand ways to adapt the exemplary embodiments to optimize performance for different types of batteries.

Exemplary types of lithium cells include lithium polymer cells, lithium ion cells, and lithium phosphate cells, each of which is suitable for use with the exemplary methods and circuits described herein.

Many other modifications, features, and embodiments of the invention will become evident to those of ordinary skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes may be made therein without departing from the spirit and scope of the invention as defined by the following claims. It should also be understood that the invention is not restricted to the illustrated embodiments and that various modifications can be made within the scope of the following claims.

What is claimed is:

1. A method for float charging a battery, comprising:
   charging a battery to a reference voltage at a rate equal to a rate of discharge of the battery, wherein the reference voltage is less than a maximum voltage of the battery;
   determining whether a voltage of the battery exceeds the reference voltage; and
   discontinuing the charging step in response to determining that the voltage of the battery exceeds the reference voltage.

2. A method for float charging a battery, comprising:
   charging a battery to a reference voltage at a rate equal to a rate of discharge of the battery, wherein the reference voltage is less than a maximum voltage of the battery;
   determining whether a current through the battery exceeds a reference current for the battery; and
   discontinuing the charging step in response to determining that the current through the battery exceeds the reference current.

3. A method for float charging a battery, comprising:
   charging a battery to a reference voltage at a rate equal to a rate of discharge of the battery, wherein the reference voltage is less than a maximum voltage of the battery;
   determining whether a temperature of the battery exceeds a predetermined temperature; and
   discontinuing the charging step in response to determining that the temperature of the battery exceeds the predetermined temperature.

4. The method of claim 3, further comprising the step of measuring the temperature of the battery with a thermistor.

5. The method of claim 1, further comprising the steps of:
   providing a power source that provides power to charge the battery to the reference voltage, and
   outputting current from the battery to a load.

6. The method of claim 5, wherein the load comprises a faulted circuit indicator.

7. The method of claim 6, wherein the power source comprises a current transformer associated with the faulted circuit indicator.

8. The method of claim 5, wherein the power source comprises at least one of a solar cell, a fuel cell, a battery, and a current transformer associated with a faulted circuit indicator.

9. The method of claim 1, wherein the battery comprises one of a lithium polymer cell, a lithium ion cell, and a lithium phosphate cell.

10. The method of claim 1, wherein charging the battery is performed using an operational amplifier.

11. The method of claim 10, further comprising preventing a backflow of current from the battery to the operational amplifier.

12. The method of claim 1, wherein charging the battery is performed using a linear regulator.

13. The method of claim 1, wherein the reference voltage is a voltage that will charge the battery to not less than forty percent of a maximum capacity of the battery and not greater than seventy percent of the maximum capacity of the battery.

14. A circuit for float charging a battery, comprising:
   a power source;
   a battery;
   a device that charges the battery to a reference voltage at a rate equal to a rate of discharge of the battery, wherein the reference voltage is less than a maximum voltage of the battery;
   a comparator that determines whether a voltage of the battery exceeds the reference voltage; and
   a microprocessor that controls the device to discontinue charging the battery in response to determining that the voltage of the battery exceeds the reference voltage.

15. A circuit for float charging a battery, comprising:
   a power source;
   a battery;
   a device that charges the battery to a reference voltage at a rate equal to a rate of discharge of the battery, wherein the reference voltage is less than a maximum voltage of the battery;
   a comparator that determines whether a current through the battery exceeds a reference current; and
   a microprocessor that controls the device to discontinue charging the battery in response to determining that the current through the battery exceeds the reference current.

16. A circuit for float charging a battery, comprising:
   a power source;
   a battery;
   a device that charges the battery to a reference voltage at a rate equal to a rate of discharge of the battery, wherein the reference voltage is less than a maximum voltage of the battery;

a temperature gauge for measuring a temperature of the battery; and a microprocessor that controls the device to discontinue charging the battery in response to determining that the measured temperature of the battery exceeds a predetermined temperature.

17. The circuit of claim 16, wherein the temperature gauge comprises a thermistor.

18. The circuit of claim 14, wherein the battery outputs current to a load.

19. The circuit of claim 18, wherein the load comprises a faulted circuit indicator.

20. The circuit of claim 14, wherein the power source comprises a current transformer associated with the faulted circuit indicator.

21. The circuit of claim 14, wherein the power source comprises at least one of a solar cell, a fuel cell, a battery, and a current transformer associated with a faulted circuit indicator.

22. The circuit of claim 14, wherein the battery comprises one of a lithium polymer cell, a lithium ion cell, and a lithium phosphate cell.

23. The circuit of claim 14, wherein the device that charges the battery comprises an operational amplifier.

24. The circuit of claim 14, wherein the device that charges the battery comprises a linear regulator.

25. The circuit of claim 14, wherein the reference voltage is a voltage that will charge the battery to not less than forty percent of a maximum capacity of the battery and not greater than seventy percent of the maximum capacity of the battery.

* * * * *